Oct. 13, 1925.
J. C. SABEL
1,557,503
OPTICAL INSTRUMENT
Filed Dec. 5, 1924
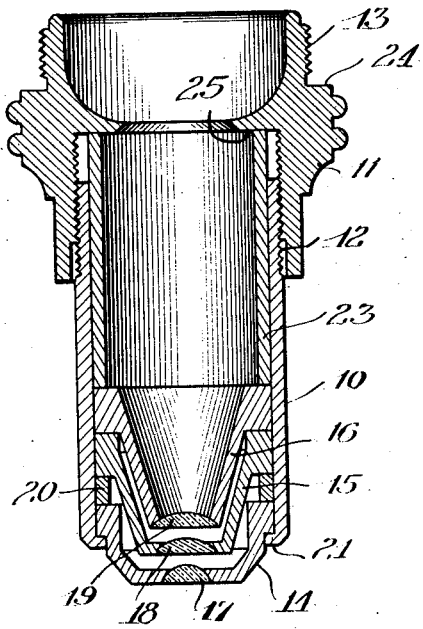
INVENTOR.
John Charles Sabel
BY
his ATTORNEY Patented Oct. 13, 1925.

1,557,503

UNITED STATES PATENT OFFICE.

JOHN CHARLES SABEL, OF ROCHESTER, NEW YORK, ASSIGNOR TO BAUSCH & LOMB OPTICAL COMPANY, OF ROCHESTER, NEW YORK, A CORPORATION OF NEW YORK.

OPTICAL INSTRUMENT.

Application filed December 5, 1924. Serial No. 754,037.

*To all whom it may concern:*

Be it known that I, JOHN CHARLES SABEL, a citizen of the United States, residing at Rochester, in the county of Monroe and State of New York, have invented certain new and useful Improvements in Optical Instruments; and I do hereby declare the following to be a full, clear, and exact description of the same, reference being had to the accompanying drawings, forming a part of this specification, and to the reference numerals marked thereon.

The present invention relates to optical instruments, and has for its object to effect improvements in instruments of this kind by increasing their efficiency and at the same time reducing their cost of manufacture.

More particularly, the invention has to do with improvements relating to the objectives of a microscope, the object being to more perfectly and economically effect parfocalizing of the objectives by improving upon the present forms of construction and methods of manufacture of instruments of this kind.

A series of microscope objectives is said to be parfocal when their lens systems are correctly adjusted with respect to certain shoulders on those portions of the objectives which are attached to the instrument when said shoulders bear a definitely fixed relation to the instrument. In other words, an objective is parfocalized when its lens system is correctly adjusted with respect to a shoulder of its mount which is definitely fixed with relation to the telescope tube with which the objective is connected. In a series of parfocal objectives such as those carried by the usual swinging nose pieces of microscopes the objectives can be interchangeably focussed upon an object without changing the focus adjustment. The object, therefore, remains in focus for any objective of a parfocal series without changing the relative position of the object to the nose piece or the nose piece to the eye piece. This is the particular type of instrument to which the present improvements are applied.

In the constructing and mounting of a delicate lens system, such as a microscope objective wherein a minute error or imperfection may produce marked inaccuracies in the results obtained, it is important to insure proper adjustment and coordination of all of the lenses of the system to afford the desired and necessary focussing of the objective. The work of mounting and organizing a delicate lens system of this type is necessarily tedious, slow and highly expensive because of the time consumed and the skill of the workmanship required on instruments of this kind.

Any method employed or form of construction devised which permits of quantity production of the objectives at a lower cost and at the same time results in elimination of inaccuracies common in the present methods of parfocalizing the objectives affords a highly desirable step in the advancement of the art, and is obviously of importance from a manufacturing stand point.

The present invention embodying improvements along these lines is illustrated in the accompanying drawing showing a section of a high power microscope objective constructed in accordance with the invention, the view being taken in the plane of the optical axis of the objective. In the embodiment shown in the drawing the casing includes a lens holding tube or mount 10 and a tubular back or base mount 11 threadedly connected with the tube as indicated at 12, and also threaded at 13 for attachment to the microscope tube or to the usual nose piece thereon, not shown, it being understood that the objective may be used with any suitable form of microscope tube well known in the art and having the necessary parts for cooperation with the objectives to afford a complete instrument of the kind desired. Furthermore, any number of different power objectives may be used with the microscope tube by providing the necessary swinging nose pieces therefor.

The lens system of the objective may include any well known arrangement of lenses properly assembled and coordinated to afford the result desired. However, I prefer the system or particular arrangement indicated in the drawing as it affords a highly satisfactory and economical form of construction. The individual lens holders of the present system are indicated at 14, 15 and 16, carrying respectively the lenses 17, 18 and 19 which are secured in the holders in any well known manner. A spacing ring 20 is disposed between the holders 14 and 15 and is of a height to afford the desired spacing between the lenses 17 and 18. The tube or mount 10 is provided at its lower end with an abutment in the form of a flange or annular shoulder 21 arranged to support the lens holder 14, which in turn supports the remaining lens holders through the medium of the ring 20. The flange portions 22 of the individual lens holders and also the ring 20 are each accurately turned to correspond to the bore of the tube 10 and each holder is slidably disposed therein, being inserted from the top and forming when assembled an objective system, the support of which is not dependent, as in the usual construction, upon a screw threaded cap or clamping ring at the lower end of the objective. The present form of casing is both simple in construction and economical to manufacture.

One of the principal features of the invention, however, as above stated, relates to improved means for parfocalizing the objectives and in carrying out this idea I provide a sleeve 23 or equivalent means inserted in and preferably closely fitting the wall of the tube 10 with its lower end resting upon the annular flange 22 of the lens holder 16. The upper end of the sleeve forms a stop for limiting the movement of the tube 10 when screwing it upon the back or base mount 11, whereby the particular lens system carried by the mount or tube 10 is properly adjusted with respect to a shoulder or abutment on the mount 11 adapted to occupy a definitely fixed relation to the instrument with which said mount is connected and which may be the external shoulder 24 or the internal shoulder 25 which abuts the sleeve 23. This adjustment by which parfocalizing is accomplished is effected by altering the length of the sleeve when completing the objective at the time of assembling the several parts thereof, the correct length being determined in each case at the time of assembling. It is understood, of course, that the sleeves are originally made long enough to allow for the maximum amount of reduction which is likely to be required in altering their length, or if desired they may be made up in several different lengths in order to reduce the amount of grinding that may be required to bring them to the proper length when assembling the parts of the objectives. This arrangement affords an extremely simple, accurate and inexpensive method of parfocalizing the objectives without causing decentration of any of the elements of the system. The sleeve 23 in addition to fulfilling the objects above described also serves as means for clamping or securing the individual lens holders within the casing, thus making it unnecessary to provide additional means for this purpose.

In parfocalizing the objectives as heretofore practiced in certain forms of microscopes the lower casing member of the objective is provided with an external flange or shoulder for receiving the lower end of the upper portion of the casing and the proper focussing or parfocalizing has heretofore been effected by turning down said lower end to effect the desired results. In the practice of this method the objective often becomes discentered because the turning operation is never done on the same lathe where the mount was originally finished, but rather at the place where the different parts of the objective are assembled to complete the instrument. It will, therefore, be seen that the improved method which I have provided is one having a decided advantage over the method just described, since neither the mounts 10 or 11 are operated upon after being centered one relative to another.

Further advantages, in the new method over the old are afforded by reducing the amount of work and material required in constructing the objectives. In the present method the casing member 10 does not require the screw cap heretofore employed on its lower end for securing the individual lens holders nor the flange for limiting the movement of the back or base portion of the casing. In addition to these economies a saving is also effected in the boring operations by making the lower casing member of one diameter throughout its length. Furthermore, in case the sleeve 23 is turned too short or otherwise spoiled the loss is considerably less than where the same mistake is made in turning down the lower end of the back or base portion of the casing, corresponding to the mount 11 of the drawing. It will be seen, therefore, that the methods employed in the present invention as well as the forms of construction shown not only afford economy in manufacture, but insure more accurate results in the construction of the objectives whereby their efficiency is increased.

I claim as my invention:

1. In optical instruments, an objective including a plurality of mounts adapted for longitudinal adjustment one upon another, a lens system carried by one of the mounts and a detachable member for limiting the movement of one mount toward another, the length of said member being such as to effect parfocalizing of the objective when assembling the parts thereof.

2. In optical instruments, an objective including a plurality of mounts adapted for longitudinal adjustment one upon another, a lens system carried by one of the mounts and a detachable member adapted to prevent longitudinal displacement of the lens system and also adapted to limit the movement of one mount toward another, said member being of proper length to effect parfocalizing of the objective when assembling the parts thereof.

3. In optical instruments, an objective including a plurality of mounts adapted for longitudinal adjustment one upon another, a lens system slidably disposed in one of the mounts and held against outward movement thereby and a detachable sleeve adapted to prevent inward displacement of the lens system, said sleeve also serving to limit the movement of one mount toward another, and being of proper length to effect parfocalizing of the objective when assembling the parts thereof.

4. In a mounted lens system, a pair of detachable mounts adjustable one upon the other, a lens system carried by one of said mounts and detachable means disposed in the last mentioned mount and adapted to form a stop for limiting the movement of the opposite mount in the direction of the lens holding mount.

5. In a mounted lens system, a casing including detachable members adapted for longitudinal adjustment one toward another, a lens system disposed within one of said members and held against outward movement thereby, and means within said casing adapted to both prevent inward movement of said lens system and to limit the movement of said detachable members one toward another.

6. In a mounted lens system, a casing including separate tubular members adapted for longitudinal adjustment one toward another, a lens holder disposed within the casing, and held against outward movement thereby and a sleeve disposed within the casing and adapted to secure said lens holder against inward movement therein and also adapted to form a stop for limiting the movement of the tubular members one toward another.

JOHN CHARLES SABEL.